United States Patent [19]

Ebisawa et al.

[11] Patent Number: 5,211,893
[45] Date of Patent: May 18, 1993

[54] METHOD FOR MOLDING RESIN REINFORCED WITH FIBER AND MOLDINGS PRODUCED

[75] Inventors: Hiroo Ebisawa, Iruma; Katsumi Kohama, Saitama; Tomohisa Abe, Shiki; Hidemitsu Takizawa, Osaka; Daisuke Atobe, Suita; Kenichi Ueda, Takatsuki, all of Japan

[73] Assignees: Honda Giken Kogyo Kabushiki Kaisha, Tokyo; Nippon Shokubai Kagaku Kogyo Co., Ltd., Osaka, both of Japan

[21] Appl. No.: 508,441

[22] Filed: Apr. 13, 1990

[30] Foreign Application Priority Data

Apr. 14, 1989 [JP] Japan .................... 1-96171

[51] Int. Cl.⁵ .............................. B29C 43/52
[52] U.S. Cl. ........................ 264/26; 264/27; 264/294; 264/319
[58] Field of Search ............... 264/257, 258, 255, 22, 264/25, 26, 27, 319, 325, 132, 511, 518, 526, 294, 546, 510; 425/389

[56] References Cited

U.S. PATENT DOCUMENTS

| | | | |
|---|---|---|---|
| 3,183,352 | 5/1965 | Brandt | 250/49.5 |
| 3,506,751 | 4/1970 | Lurie | 264/132 |
| 3,546,740 | 12/1970 | Johnson | 425/389 |
| 3,878,019 | 4/1975 | Chapman et al. | 156/272 |
| 4,510,103 | 4/1985 | Yamaguchi et al. | 264/40.2 |
| 4,510,198 | 4/1985 | Rheaume | 264/546 |
| 4,613,470 | 9/1986 | Aftalion | 264/22 |
| 4,715,923 | 12/1987 | Knoll | 425/389 |
| 4,740,335 | 4/1988 | Scholz et al. | 264/294 |
| 4,783,303 | 11/1988 | Imgram | 264/510 |
| 4,814,119 | 3/1989 | Scholz | 264/22 |
| 4,911,973 | 3/1990 | Dunbar | 264/258 |

FOREIGN PATENT DOCUMENTS

| | | |
|---|---|---|
| 59-201822 | 11/1984 | Japan . |
| 61-205121 | 9/1986 | Japan . |
| 920798 | 3/1963 | United Kingdom . |
| 940407 | 10/1963 | United Kingdom . |
| 1095524 | 12/1967 | United Kingdom . |
| 1484114 | 2/1976 | United Kingdom . |

*Primary Examiner*—Tim Heitbrink
*Attorney, Agent, or Firm*—Nikaido, Marmelstein, Murray & Oram

[57] ABSTRACT

The method for molding a resin reinforced with fiber wherein a resin sheet reinforced with fiber is positioned juxtaposed a face of a mold, which is either one of a female mold or a male mold, and then hardened, but before molding, modifying the viscosity to different levels in different portions of the resin sheet. Thus, it is possible to surely prevent occurrence of a partial difference in thickness of the moldings or, if necessary, to partially change these thicknesses according to predetermined values.

22 Claims, 3 Drawing Sheets

METHOD FOR MOLDING RESIN REINFORCED WITH FIBER AND MOLDINGS PRODUCED

BACKGROUND

The present invention relates to a method for molding a fiber-impregnated sheet molding compound (hereinafter, "sheet molding compound" is referred to as SMC) to produce moldings of a solid shape. It also relates to the moldings produced by this method.

In order to produce moldings having a solid shape by using a SMC, a method has so far been used, wherein a SMC of high viscosity is cut into a proper size, this cut sheet is introduced into a mold for forming, composed of a male and female pair of molds, and high temperature and high pressure is imposed thereon, whereby forming a defined shape by proper shaping and curing.

However, this method is highly expensive because of the complexity and expensiveness of the metal mold and the requirement for high pressure equipment. Therefore, it is economically disadvantageous. Also, molding under pressure requires a long time, so that it is difficult for the method to respond quickly to a request for a particular product. This long molding time, accompanied by diversification of product needs, increasing variety of small quantities in a given order and shortening of the time limit demanded for delivery is difficult to achieve.

On the other hand, to solve the defect in the above method, a method has been proposed in the Japanese official patent provisional publication (showa 61-205121), wherein a pre-preg sheet, which is not yet hardened, and is composed of an SMC, is adhered under vacuum along a female mold for shaping, and then is hardened by irradiating with ultraviolet light. Since this method uses only a female mold as a mold for forming, does not require such accurate mold precision, and does not need high pressure and high temperature, there are benefits to be derived, such as inexpensive cost for equipment and a relatively simple molding process, so that efficiency increases in the molding operation can be achieved.

There is, however, a problem in the prior art, in that the thickness of the shaped pre-preg sheet, viz. a moldings, locally differs as a function of the time which, after the vacuum-adsorption operation is initiated, is needed to bring the pre-preg sheet into contact with the female mold.

Figure 8:
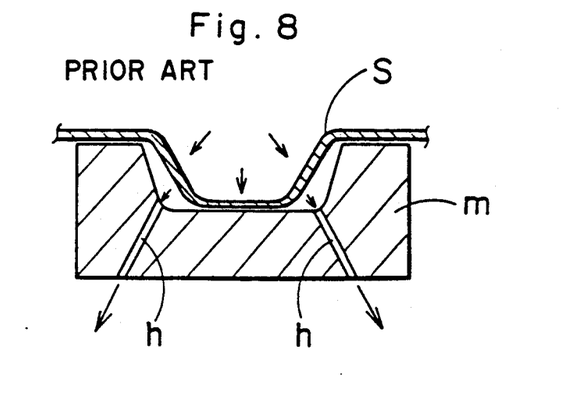
FIG. 8 is a cross-sectional view which shows a condition of forming in a conventional example.

FIG. 8 shows a typical conventional method for molding. A pre-preg sheet is arranged on an upper face of a female mold m. That is, the sheet for forming S is sucked, by reducing pressure through suction holes h which open on a mold face of the female mold m, onto the female mold. A central part of the sheet for forming S is at first sucked into the center of the female mold m. After the central part of the sheet for forming S comes into contact with the mold face, a circumferencial part of the sheet gradually undergoes the shaping in contact with the mold face and, at this time, in the central part which has at first come into contact with the mold face, the resin material is carried away toward the circumferencial part by back pressure which is accompanied by the vacuum adherence, so that the sheet for forming becomes thinner in this central part. In addition to decreasing the thickness of the central part of the sheet for forming as mentioned above, the thickness of the sheet for forming S, when compared with what would have been expected, locally differs in that the resin material of the sheet for forming S flows or is unevenly distributed as a function of the unevenness and inclination of a mold face of the female mold.

In a method wherein the forming is carried out at high temperature and high pressure under conditions such that a material for forming is disposed between a male and female pair of molds for forming, a molding which exactly corresponds to the shape of the male and female molds for forming is obtained and, therefore, a problem of the above kind does not take place. However, in a method wherein the sheet for forming S takes a shape along the mold for forming by using either one only of a male or a female mold for forming, the shape and thickness of the sheet for forming S can not be controlled, at the side of the sheet for forming S which is not in contact with a mold face, so that a deviation in thickness as mentioned above inevitably occurs.

If the sheet for forming S, after shaping of the above kind, that is after molding, shows a difference in thickness when compared with the expected value, mechanical strength may decrease where the thickness is thin or the moldings may lack their expected properties. Therefore, in a method of said conventional art, moldings of fiber-reinforced plastics (hereinafter referred to as FRP), which are controlled as to their desired thickness, in order to get desired properties, have not been obtained.

SUMMARY OF THE INVENTION

The subject of the present invention is to provide a method for molding which solves the problems in the conventional art where the thickness of moldings so produced is freely controllable, the occurrence of local difference in thickness is surely prevented, and the thickness, if necessary, can be locally changed according to predetermined values.

The method for molding a SMC according to the present invention, which solves said problems, is designed so as to provide beforehand a position in said sheet for forming, which has a partially different viscosity, and to otherwise use the known method for forming a pre-preg sheet, comprised of a SMC, and shaping and hardening it along one mold for forming, comprising either a male mold or a female mold, to obtain moldings of an FRP.

DESCRIPTION OF THE INVENTION

The examples in the present invention are shown in FIGS. 1–7 and explained referring to these drawings.

For an SMC used in the molding method of this invention, conventional resin materials for forming, which are reinforced with fiber, can be used, which is the same as the materials that have been used in the method for molding the hitherto-known resin reinforced with fiber. As the resin material composed of SMC, a thermosetting resin is conventionally used. As the resin material composed of the SMC, a material is used, which can have its viscosity or hardness adjusted, such as by the application of light, radiation and so on, or by heating. For example, for adjusting the viscosity with irradiation of light, a material is used which undergoes a photosetting of the resin alone, or where an initiator for the photoreaction (for example, a photosensitizer) is also present, or one which increases its viscosity with a photoreaction. Specifically, these are illustrated by: an unsaturated polyester resin, an epoxy resin, a thermosetting (meth) acrylate resin, a polyurethane-(meth) acrylate resin, and an epoxy(meth) acrylate resin. Among these, it is especially preferred to use the unsaturated polyester resin, the thermosetting (meth) acrylate resin, the polyurethane-(meth) acrylate resin, and the epoxy-(meth) acrylate resin. In the foregoing, the term (meth) acrylate is intended to disclose and embrace both the acrylates and methacrylates.

As the initiator for a photoreaction, hitherto-known conventional initiators for various kinds of photochemical reactions can be used depending upon the kind of resin materials involved. For example, a reagent for a radical reaction is used for a thermosetting resin of a radical reaction type and a photoreaction initiator which causes an addition reaction with ring-opening of an epoxy substituent is used for the epoxy resin. The amount of the photoreaction initiator added to the resin material is usually 5% or less by weight of the total resin.

In a case where the viscosity adjustment of the resin material is carried out by a means other than light irradiation, for example, by heating, a curing agent etc., which corresponds to the respective reaction, can be used instead of the photoreaction initiator.

As the fiber for reinforcing an SMC material together with the resin material, various kinds of organic fibers or inorganic fibers can be used in a similar way to the case of a conventional FRP. In the case where the viscosity adjustment of the resin material is carried out by light irradiation, a fiber having light permeability is preferably used for reinforcement. These are illustrated by a glass fiber and a polyester fiber. In addition, provided they are not needed for viscosity adjustment of a resin material by light irradiation, reinforcing fibers which do not have light permeability can be used. Specifically, there are cited a carbon fiber, an aluminum fiber, a stainless steel fiber, a copper fiber, and a glass fiber covered with aluminum. In the case where the viscosity adjustment of the resin material is carried out by a means other than light irradiation, the use of reinforcing fibers having light permeability is unnecessary, and reinforcing fibers which are suitable for the respective viscosity-adjusting action can be used.

Each of the foregoing reinforcing fibers can be combined with a resin material of a variety of types similar to those which are used for the conventional FRP, for example, there are cited fibers which are about 1-100 mm in length, and mat type fabrics comprised of long fibers which are spread all over in a loop. Although the fiber content of an SMC depends on the strength which is required of the moldings, the fiber content is usually 5-60% by weight, preferably 20-50%, based on the total weight of SMC.

The method by which the aforementioned SMC is shaped and hardened can be carried out with various kinds of curing means, either alone or in plural combination, which have been used in the conventional methods, such as photosetting, curing with heating or at ordinary temperature. The means for viscosity-adjusting of the foregoing resin material itself can be used as a curing means for the SMC. That is, for example, if the amount of the foregoing photoreaction initiator is arranged so as to be enough for complete curing of the resin material, the SMC can be set up by only the photo-curing.

In the case where viscosity adjustment curing, by heating or at ordinary temperature, is used in combination with photo-curing, a curing agent which is suitable to the respective curing reactions can be appropriately selected.

As a curing agent for a thermosetting resin of a radical reaction type, there are cited the organic peroxides, which are represented by methyl ethyl ketone peroxide and benzoyl peroxide etc., the diazo compounds, which are represented by azobisisobutyronitrile, and a series of compounds which are salts of organic metal compounds represented by cobalt octenate, or an amine compound, represented by dimethylaniline combined with an organic peroxide. The amount of these curing agents is suitably in a range of about 0.01-6% by weight of a total weight of the resin material.

As the curing agent for the epoxy resin, for example, there are cited polyvalent primary or secondary amines and polyvalent carboxylic acids etc., and the amount of these compounds which is usually employed is in a range of 0.3-3 equivalents per equivalent of the total amount of the resin material.

Each of the foregoing curing agents effectively acts not only for curing SMC after shaping, but also for adjusting the viscosity of the SMC before shaping.

The SMC, as described above, is composed of reinforcing fiber and resin material and, for the resin material, a photoreaction initiator or a curing agent is involved for adjusting the viscosity and curing. Also, if necessary, other conventional filling agents, stabilization agents, coloring agents, and thickness and the like may be combined. However, these additives must be used only within a range such that the partial viscosity adjustment of the SMC is possible.

For the pre-preg sheet for forming, one composed of only a resin layer reinforced with fiber may be used and, where necessary, a layered product derived from the resin layer reinforced with fiber and a material other than the resin layer reinforced with fiber, may be used.

Figure 1:
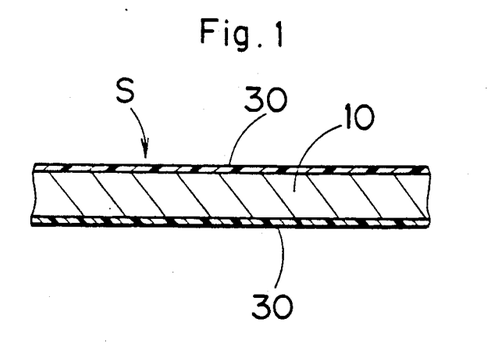
FIG. 1 is a cross-sectional view of a sheet for forming which is used in the examples of this invention.

For example, as shown in FIG. 1, a sheet for forming can be used together with a covering film 30 having elasticity which is layered on both sides of a resin layer reinforced with fiber 10. The covering film 30 prevents air bubbles from entering the sheet for forming S when the sheet for forming S is shaped by vacuum or with pressure, or it increases ease of handling characteristics by maintaining the shape of the sheet for forming S when the resin layer reinforced with fiber 10 is soft and weak. It also prevents the sheets for forming S from adhering to each other when the sheets for forming S are piled and charged. The covering films 30, if it can carry out the forementioned functions, may be disposed as layers on both sides of the resin layer reinforced with fiber 10 or on only the one side thereof. However, where the viscosity of the resin material composing the resin layer reinforced with fiber 10 is low and soft, it is preferred that the covering film 30 is disposed on both sides of the resin layer reinforced with fiber 10.

The covering film 30, since it is layered on the resin layer reinforced with fiber 10 which has not yet been hardened, must be one which is not soluble in the resin material of the resin layer reinforced with fiber 10. Besides, in a case where the partial viscosity adjustment of the sheet for forming S is carried out via irradiation of light, a light permeable film has to be used on at least the side of light irradiation in the case where both sides of the resin layer reinforced with fiber 10 are covered with the covering film 30. Further, since the shaping of the sheet for forming S is carried out while the covering film 30 is layered thereon, the covering film 30 must be the one which can stretch to accompany the deformation of the sheet for forming S. As the covering film 30, although various kinds of materials may be used which are similar to those used for molding the conventional SMC, it is preferred to use films made of vinylon, polyvinyl alcohol, nylon, polyethylene, polyvinyl chloride, polyvinylidene chloride, or polypropylene etc. and among those, vinylon and polyvinyl alcohol are especially preferred. Since the covering film 30 is peeled off and removed after the molding of the sheet for forming S is obtained, it should also be used in combination with a film which has a good peeling character with respect to the resin moldings reinforced with fiber. The thickness of the covering film 30 is usually preferred to be in a range of 10-100 μm.

The method for producing the sheet for forming S as explained above can be carried out in the same way as the method used for producing a conventional SMC. For example, a method for producing the sheet for forming S may be adopted wherein a resin solution, which is combined with a component other than a reinforcing fiber, is applied on the covering film 30. Then a resin layer reinforced with fiber 10 is formed by laying the reinforcing fiber on the resin solution. Furthermore, after the covering film 30 is laid on the resin layer 10, any bubbles are suitably removed. Alternatively, there is a method wherein said resin solution is soaked onto the reinforcing fiber which is laid on a covering film and, after a further covering film is laid on it and any bubbles are removed, a sheet for forming S is prepared. Alternatively, there is a method wherein a resin layer reinforced with fiber is made by soaking the resin solution onto the reinforcing fibers, and then this mixture is disposed between two sheets of covering films to release bubbles, whereby a sheet for forming S is made.

To facilitate handling and cutting for the sheet for forming S thus-prepared, it is required that the resin layer reinforced with fiber 10 of the sheet for forming S has a certain degree of hardness, that is, viscosity. For this, in a case where the viscosity of a resin material constituting the resin layer reinforced with fiber 10 is low and too soft, the following methods can be adopted. One of these methods is to raise viscosity of the resin solution itself before soaking onto the fiber for reinforcing. The other is, after the resin solution is soaked onto the fiber for reinforcing, increasing the viscosity of the whole resin material to a defined extent by such a proper means as heating or light irradiation.

The sheet for forming S, prepared as described above, is provided for molding by means of shaping and curing. In this invention, the viscosity adjustment is carried out so that the viscosity of the resin layer reinforced with fiber 10 of the sheet for forming S may be partially changed in advance of the shaping.

Figure 2:
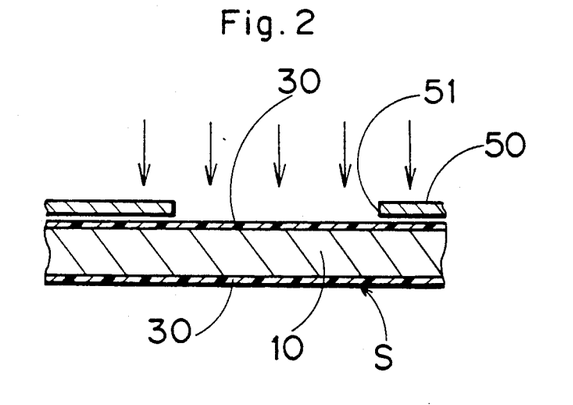
FIG. 2 is a cross-sectional view which shows one example of adjusting the viscosity of a portion of a sheet for forming.
Figure 3:
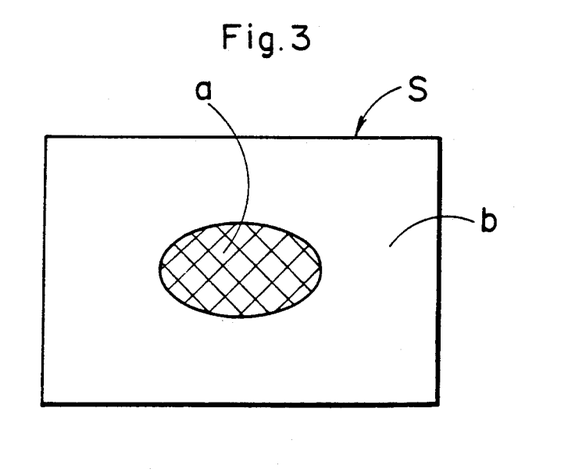
FIG. 3 is a plane view of a sheet for forming in which the adjustment of the partial viscosity is carried out.

FIGS. 2 and 3 show examples of the methods for adjusting viscosity. Light irradiation is carried out under a condition such that an opaque mask 50 having a hole 51, in a position where the viscosity-increase is intended, on a side of the sheet for forming S having a photo-curing character, whereby only the resin layer reinforced with fiber 10 is exposed at the place where the light irradiation is carried out. This causes a photoreaction and, as a result, the viscosity increases more in that place than in other areas about the circumference. For example, in a plane view of the sheet for forming S shown in FIG. 3, the central oval indicates a viscosity-increased area a and around it is an area of lower viscosity where there is little or no viscosity-increase. Besides, if an integrated luminous flux, for example a laser light, is used for irradiation only at the place where the viscosity increase is intended, the formentioned mask 50 becomes unnecessary. In a case where partial adjustment of viscosity is carried out with a radiation other than the light irradiation, it is possible to use said mask 50 or a confined radiation beam. In a case where partial adjustment of viscosity is carried out by heating, for example, the high viscosity area a can be formed by partially heating the sheet for forming S. This can be performed by arranging a heater very close to the area where the viscosity-increase is intended, at one side of the sheet for forming S.

The arrangement of the pattern of the high viscosity part a and of the low viscosity part b of the sheet for forming S can be set optionally. Usually, the high viscosity part a is arranged at a place, where thickness increased compared to what is expected, by means of a conventional method for molding, and the low viscosity part b is arranged at the other place.

The sheet for forming S can be formed not only into two parts with two different kinds of viscosity that is a high viscosity part a and a low viscosity part b, but it can also form a part where the viscosity differs in three steps or more. For example, instead of a part or whole of the mask 50 having said hole 51, if a mask 50, which partially differs in transparency is used, the viscosity can be changed in multi steps depending upon the change in transparency. Besides, by using said laser light, the viscosity can optionally be adjusted by partially changing the irradiation time of light.

Furthermore, in a case where the shape of moldings to be produced is known beforehand and a pattern of viscosity-increase by preliminary exposure for light is known, if a covering film 30, which is patterned in a defined mode by using a semi-transparent and/or an opaque ink, on only one side, a function which is similar to that of the mask 50 having said hole 51 or the mask 50 in which transparency partially differs, can be fulfilled. Especially, this method is effective where, together with the viscosity adjustment by light irradiation, a partial viscosity adjustment by heating is used in combination with the viscosity adjustment by curing at ordinary temperatures for the whole sheet for forming S.

That the partial viscosity adjustment for a sheet for forming S, such as viscosity-increase by the preliminary exposure of light due to light irradiation, should be applied to a part of the sheet for forming S, and the extent of differing viscosity depends upon the viscosity of a resin material itself, the shape of the moldings, the conditions and the equipment used for molding, and the working circumstances etc. If these conditions are set, the aforementioned area being converted and the extent of conversion are easily determined by a simple experiment. For managing the extent of change of viscosity for each part of the sheet for forming S, direct management of the viscosity of the resin material itself is not always necessary. The purpose can be attained by managing the light irradiation and heating time which are carried out under definite conditions.

The partial viscosity adjustment of the sheet for forming S can be carried out just before the sheet for forming S is arranged in the mold for forming and undergoes the molding, or it can be carried out in advance of the molding.

The sheet for forming S, having a part where the viscosity partially differs, is formed as described above, is shaped on the surface of one or a pair of female and male molds for forming, and then is cured, whereby the desired resin moldings reinforced with fiber are obtained. A method like this, wherein a female and male pair of molds for forming are not used and the molding is carried out with either one mold only, has hitherto been known to the public and, more specifically, these hitherto known, various kinds of molding methods can be applied.

As the method for shaping of the sheet for forming S, there are, for example, the following two methods.

(A) A method for shaping the sheet for forming S, wherein a female mold is used as a mold for forming and, after the sheet for forming S is fixed by covering an opening in this female mold, the sheet for forming S is adsorbed onto the mold face by making the pressure on the mold face side of the sheet for forming S larger than the pressure on the opposite face side.

(B) A method for shaping the sheet for forming S by deforming it against a male mold, wherein a male mold is used as a mold for forming and the male mold is pressed against the sheet for forming S under conditions such that the circumference of the sheet for forming S is fixed.

Figure 4:
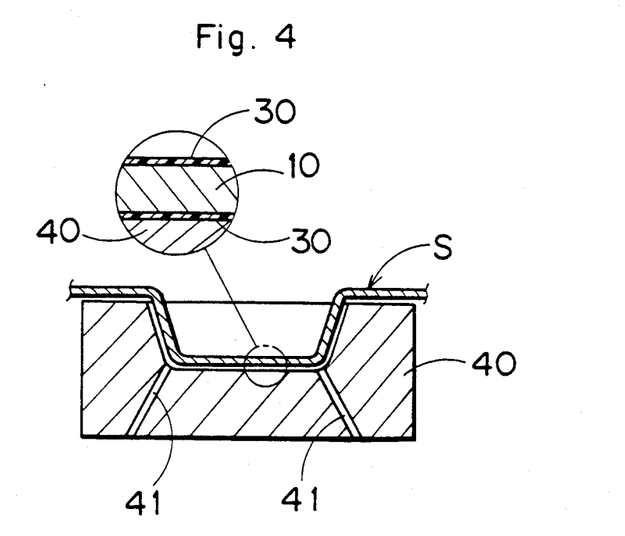
FIG. 4 is a cross-sectional view during forming.

One example of said method (A) is shown in FIG. 4. In a mold for forming 40, of a female mold type, whose central part is hollow, a vacuum suction hole 41 is set at a proper position in the mold face. A sheet for forming S is laid on the mold face and a vacuum is applied through the hole 41 whereby the pressure on the backside of said mold face is made smaller than atmospheric pressure such as to press the sheet for forming S into tight contact with the mold face of the mold for forming 40. This method is a so-called vacuum forming method. The vacuum forming method is a preferable method, because the structure of the molding apparatus and the molding operation are simple.

In the vacuum forming method, the force applied for shaping the sheet for forming S is a maximum of one atmospheric pressure. In the case where the viscosity of the resin material of the sheet for forming S is high, one atmospheric pressure may not be enough for shaping. In this case, an auxiliary force to increase the pressure on the sheet for forming S can be applied in addition to said vacuum. Practically, for example, there is a method in which a proper, tightly closed space is formed on the opposite side of the face of the sheet for forming S that is being suctioned under vacuum, and, to apply pressure, pressured air is put into this space. Alternatively, a method can be practiced, in which pressure is applied on said opposite side of the sheet for forming S by pressing such with a proper instrument such as a plug. Further, it is possible to apply the auxiliary pressure by means of a tightly closed body having elasticity like a balloon, which is fixed to a supporting body and arranged against said opposite face of the sheet for forming S. In this embodiment, pressurized air is put into this tightly closed body for expansion, which then pressurizes the sheet for forming S and so on. In addition, there is a method in which the whole apparatus for molding is placed in a pressured container, thereby said opposite side of the sheet for forming S, which is opened to the space inside the container, is pressured. In this method, it is preferred that the mechanism for vacuum adsorption is set as operating from outside of the pressured container.

Where the force for pressuring supplied by each of the forementioned methods is enough, it is possible that the shaping of the sheet for forming S is carried out with only the force for pressuring, without the application of vacuum. The molding method with pressurized air is the one which is usually referred to as a pressure forming. However, where the shaping is carried out with only the force for pressuring, it is necessary that any gas which exists between the sheet for forming S and the mold face be evacuated, and the sheet for forming S placed in close contact with the mold face. For this it is preferred that a ventilation hole, through which said gas is naturally evacuated, is provided in the mold for forming 40. It is preferred that the pressuring is usually about 10 atmospheres or less.

In said method (B), where the molding has a simple shape, the shaping is possible by only pressing the male mold against the sheet for forming S, whose circumference is fixed. However, where the molding is of a complex shape, the shaping may be carried out by shaping to a certain extent by pressing a male mold against the sheet for forming S and then, the space which remains between the sheet for forming S and the male mold is extinguished by a means similar to said method (A). The shaping is completed by tightly contacting the sheet for forming S with the male mold. As a practical means for extinguishing the space the air in said space can be evacuated and the sheet for forming S is then forced against the mold under vacuum. Alternatively, the force for pressuring can be positively applied from the opposite face of the sheet for forming S.

Figure 5:
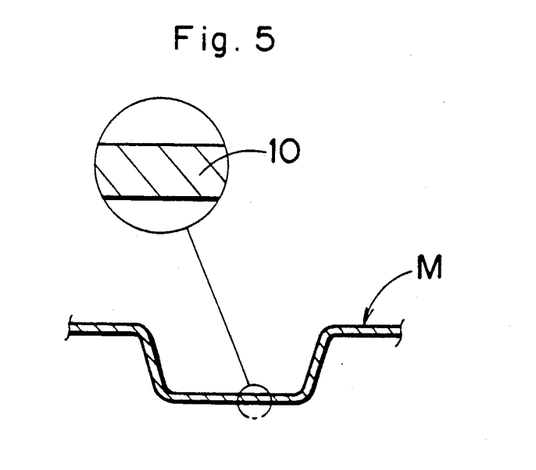
FIG. 5 is a cross-sectional view after the forming has been finished.

The sheet for forming S, which is shaped according to said method, after being cured by the usual curing means, is taken out of the mold for forming 40 and, as shown in FIG. 5, the molding M is obtained by peeling off of the covering films 30 from both the faces. In order to cure the sheet for forming S, it is possible to lightly irradiate the molded sheet, to heat the molded sheet, to simply allow the molded sheet to age at ordinary temperature, and/or by a combination of the forementioned methods.

Since the resin moldings reinforced with fiber M may need to have a smooth surface which is also colored, it is possible to apply a resin layer to the surface, such as a gelcoat layer etc. Previously, this resin layer was formed on the surface by a means such as coating etc. on a surface of the formed moldings, but according to the invention the surface resin layer may be formed by the following methods.

Figure 6:
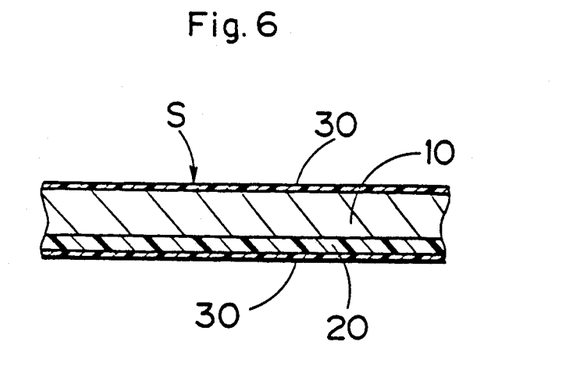
FIG. 6 is a cross-sectional view of a sheet for forming which is used in another example.
Figure 7:
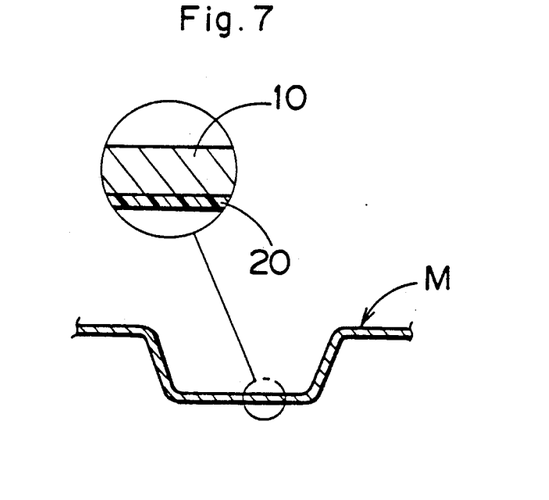
FIG. 7 is a cross-sectional view after forming.

As show in FIG. 6, a sheet for forming S is used in which resin is layered on one surface 20 of the resin layer reinforced with fiber 10 and this composite sheet for forming S is molded by the above recited means to form moldings M, having a layer on the surface 20 as shown in FIG. 7.

As the surface resin layer 20, a resin material which contains a component necessary for improving the surface property of the moldings M can be freely used. For example, a resin material which is the same as the resin material constituting the resin layer reinforced with fiber 10, but which does not contain fiber for reinforcing, can be used. Additionally a resin material which contains an additive, such as a coloring agent etc., can be added to said resin material. A resin material, wherein a surface mat or a non-woven cloth etc. is incorporated with the resin material and the like, can also be used. The surface resin layer 20 may be formed on only one side of the resin layer reinforced with fiber 10 suitably the exposed surface of the moldings M, but where both sides of the moldings M are exposed, if necessary, the surface resin layer 20 may be applied to both sides of the resin layer reinforced with fiber 10.

The method for shaping moldings of the sheet for forming S, having a surface resin layer 20, with partial viscosity adjustment, viscosity-increase of the whole part, or shaping and curing is similar to the method for molding a sheet for forming S, in which said resin layer on the surface 20 is absent.

In the case where a sheet for forming has different portions comprising different viscosities, when the sheet for forming is stretched under the tension generated by the shaping operation, the portion thereof having a higher viscosity is more difficult to stretch than the portion of lower viscosity. Therefore, if a portion of the sheet for forming, where the tension generated by shaping acts particularly strongly or over a longer time, is increased in viscosity, the portion can be prevented from thinning. Also, if a portion of the sheet for forming comes into contact with a mold at an early stage of the shaping, and becomes thinner than expected because material runs away from that portion by being pushed, before the other parts come into contact with the mold, by the action of back pressure of the mold as well as the shaping pressure, the thinning of that portion of the sheet can be prevented by increasing the viscosity of that portion. Furthermore, if moldings have portions with partially different thicknesses, a position of the sheet forming which corresponds to the part where thickness is to be increased, is subjected to viscosity-increase, and a position of the sheet for forming which corresponds to the part where thickness is to be decreased, is subjected to viscosity-decrease, or the viscosity is unchanged, and thus, the different thicknesses as of different portions of the moldings can be finely controlled.

Next, concrete examples of this invention are explained. In the following explanation the term "part" means part by weight and the term % means % by weight.

Molds for forming are used as follows.

A first mold for forming has an opening part of 25×25 cm, a bottom part of 24×24 cm, and a depth of 10 cm. It is a boy-shape female mold made of iron which has holes for air-evacuation (openings for application of a vacuum there through) at the four corners of the bottom part.

A second mold for forming is a female mold which is made of wood and is a half sphere shape of 15 cm diameter.

A third mold for forming has a gourd shape which is made such that the end has a curved surface having a radius of curvature about 50 cm and a cross section which is so arranged as to have two circles of radii of 10 and 20 cm and a distance of 20 cm between the centers of the circles. It is a male mold of height 10 cm made of FRP (which has a draft of about 3° and has six holes for ventilating at the narrow part of the gourd).

As the resin materials to be used for the sheet for forming S, the following resins A and B are first produced.

Resin A

A unsaturated polyester, having an acid value 35, was obtained according to a method known to the public, by using phthalic anhydride, maleic anhydride, and propylengelycol in their respective proportion of 5, 5, and 11 moles, and 65 parts of this unsaturated polyester, 35 parts of styrene, and 0.005 parts of hydroquinone were mixed, whereby an unsaturated polyester resin having a viscosity of 4 poise at 25° C. was obtained.

Resin B

An epoxymethacrylate having an acid value of 5 was obtained, according to a method known to the public, by using an epoxy resin of a bisphenol type (epoxy equivalents of 185), methacrylic acid, hydroquinone, and triethylamine in their respective proportion of 185, 86, 0.05, and 0.8 parts, and 70 parts of this epoxymethacrylate and 30 parts of styrene were mixed, whereby an epoxymethacrylate resin having a viscosity of 1 poise at 25° C. was obtained.

EXAMPLE 1

A resin solution was prepared by mixing 100 parts of the resin A with 2 parts of benzoin methyl ether (a photoreaction initiator). The resin solution, 75 parts, was soaked into 25 parts of a glass fiber (a mat of fibers having a length of 2 inches) which was disposed on a covering film (a vinylon film of thickness 25 $\mu$m), whereby a resin layer reinforced with fiber was formed. Furthermore, a covering film was placed on this layer. After removing all of the bubbles from the resin, a sheet for forming of thickness of 3 mm (glass fiber content was 25%) was obtained by sealing the edges.

This sheet for forming was disposed over the opening hole part of said mold for forming 1 and, after its circumference was fixed and sealed with a fixing tool, it was covered with a mask, except a part which was 5 cm from the outer edge. In the mask used, a 10×10 cm portion, at a position which corresponds to a central part of the opening hole part of the mold for forming 1, was made of a semi-transparent plastic and the rest of the mask was made of an opaque plastic sheet.

Next, an ultraviolet light irradiation apparatus, which was designed so as to irradiate an ultraviolet light onto a substrate to be irradiated from a distance of about 10 cm with 10 pieces (400 W) of a low-pressure ultraviolet lamp of a fluorescent lamp type, was installed above the sheet for forming which was covered with the mask, and the sheet exposed through the mask for the light for 20 seconds. As a result, the viscosity of the sheet for forming was different in different portions thereof, and was highest in the circumference part which was not covered with the mask, lower in the part which corresponded to the semi-transparent plastic sheet, and lowest in the part which corresponded to the opaque plastic sheet.

Then, the mold was evacuated and the sheet for forming was fitted and molded to the mold face of the first mold for forming. After the mask was taken away, similarly to the above, further irradiation by ultraviolet light was carried out for 10 minutes to harden the whole of the sheet for forming, whereby a resin molding reinforced with fiber of a box shape, with the shape of the first mold for forming, was obtained.

The molding obtained was cut and investigated for thickness. The investigation showed a ratio of 1.7 between the maximum thickness and the minimum thickness (hereinafter referred to as the thickness ratio).

To investigate any difference between said example 1 and a product made by a conventional method, the process of example 1 was repeated, except that the process in which viscosity was partially adjusted in the sheet for forming by use of the mask, was omitted to produce a molding in the example for comparison 1. The thickness ratio for the moldings in the example for comparison 1 was 5.7. Also, a part of the maximum thickness was at a corner of the bottom face, a part of the minimum thickness was at the side face, and the bottom face showed an intermediate thickness.

From the above results, it was proved that, by practicing the method of molding according to the present invention, variations in the thickness of different portions of moldings has been greatly reduced.

EXAMPLE 2

A sheet for forming which was the same as that used in the example 1 was fixed to a tool of a doughnut shape, having a hole of diameter 16 cm. The hole in the tool was covered with an opaque mask except to an extent of 4 cm in diameter at the central part. An ultraviolet light irradiation apparatus which was the same as in Example 1 was used. The sheet for forming, which was covered with the mask, was installed and exposed to UV light for 15 seconds at a distance which was the same as that in the Example 1. As a result, the sheet for forming was adjusted in viscosity so that a part, which corresponded to a central part of the mask, had a higher viscosity than the other parts.

After the mask was taken off, using a second mold for forming, the sheet for forming was shaped along the mold face by pressing the mold for forming to the sheet for forming in such a way that a top part of the mold was disposed at the center of the hole in the tool of a doughnut shape. Then, ultraviolet light irradiation was carried out for 10 minutes, in the same way as above, to harden the whole sheet for forming, whereby a resin molding, reinforced with fiber, of a half-sphere shape was obtained. The thickness ratio for this molding was 1.6.

The process of Example 2 was repeated, except that the process which partially adjusted the viscosity of the sheet for forming, by irradiating through a mask, was omitted to get a molding in the example for comparison 2. The thickness ratio for the moldings in the example for comparison 2 was 5.4, the part of minimum thickness was a center part where the sheet for forming was at first brought into contact with the second mold for forming, and the part of maximum thickness was a part which was spaced by about two-thirds of the distance from said part of minimum thickness to an edge.

From these facts, it is seen that the molding of example 2, when compared with the moldings made by the example for comparison 2, shows far smaller variation in thickness.

EXAMPLE 3

A resin solution was prepared by mixing 100 parts of resin A, 0.1 part of benzoin methyl ether, 1.5 parts of tertiarybutyl perbenzoate (a catalyzer for hardening at high temperature), and 0.3 parts of magnesium oxide (a thickener).

This resin solution, 70 parts, was applied on a polyvinyl alcohol film (thickness of 40 $\mu$m), which converts into a covering film, on which 30 parts of glass fibers (a glass strand length of 10 mm) were spread. Further, after the resin composition was debubbled, it was held for 24 hours at 40° C., whereby a sheet for forming a thickness 3 mm, and glass fiber content of 30%, was obtained. To examine the viscosity of the resin material in this sheet for forming, the same resin solution was placed in a glass bottle and held for 24 hours at 40° C., whereby a viscosity of 450 poise was observed.

This sheet for forming was arranged in a first mold for forming in the same way as carried out in said example 1. The sheet for forming, having dimensions of 17×17 cm, which corresponded to a center part in the opening hold part of the first mold for forming, was covered with an opaque mask.

Next, the first mold for forming, having this reinforced sheet, was arranged in an ultraviolet light irradiation apparatus, which was the same as used in example 1, and exposed to light for 60 seconds as carried out in example 1. As a result, the sheet for forming was adjusted in viscosity so that the circumference part was higher than the central part covered with the opaque mask.

The sheet for forming was fitted to the face of the first mold for forming by placing the first mold for forming in an environment which was capable of being freely heated and pressured, and was pressurized (5 kg/cm$^2$g) as well as, at the same time, heated to 130° C., and then a molding was obtained by hardening the shaped sheet.

At this time, a metal pipe was connected to a hold for evacuating air from the first mold for molding, and its terminal end was opened to the outside, so that the air between the sheet for forming and the mold face of the first mold for forming was naturally evacuated.

The moldings thus-obtained showed 2.1 for the thickness ratio between the side face and the bottom face. This example 3 is a case when the thickness distribution of a molding has been changed positively by adjusting the viscosity of the sheet for forming, and the mechanical strength and so on was improved by increasing the thickness of the side face more than that of the bottom face.

The process of example 3 was repeated, except that the partial viscosity adjustment of the sheet for forming by means of a mask was not carried out to obtain a molding of example for comparison 3. The moldings in this example for comparison 3 showed a thickness ratio between the side face and the bottom face of 0.7, and since the side face was thinner than the bottom face, the mechanical strength and so on was inferior compared with those of the moldings in example 3.

EXAMPLE 4

A resin solution was prepared by mixing 100 parts of resin B, 0.8 parts of benzoin methyl ether, 1 part of methyl ethyl ketone peroxide (a catalyst for hardening the resin at room temperature in which the peroxide content was 55%), 0.2 parts of cobalt octenate (an accelerating agent for hardening at ordinary temperature in which the metal content was 8%), 0.01 part of dibutyltin dilaurate (an accelerating agent for the thickness in which the metal content was 8%), and 2 parts of toluene diisocyanate (a thickener).

This resin solution, 70 parts, was applied on a covering film (thickness 40 μm), composed of a polyvinyl alcohol film, which was treated with a silicone agent for mold-releasing, and on which 30 parts of a glass fiber (a glass strand length of 10 mm) was spread. A further layer of covering film was arranged on the resin solution. The resin solution was degassed whereupon a sheet for forming having a thickness of 2 mm, which had a 30% content of a glass fiber, was obtained.

The sheet for forming was fixed to a tool of a doughnut shape having an elliptical hole having a major axis of 50 cm and a minor axis of 40 cm. The hole in the tool was covered with an opaque mask, except the extent of an elliptical shape having a major axis of 15 cm and a minor axis of 10 cm, corresponded to the center part in the hole.

Next, an ultraviolet light irradiation apparatus, which was the same as used in the example 1, was positioned, the sheet for forming covered with the mask was arranged and, after exposure to light for 15 seconds, as carried out in example 1, the mask was taken off. As a result, the sheet for forming was adjusted in viscosity so that the viscosity of the center part was higher than that of the circumference part covered with the mask.

In such a way that a top part of the third mold for forming corresponds to a center of the hold of the tool, the third mold for forming was pressed to the sheet for forming. Successively, after the basic parts of the sheet for forming and the third mold for forming were sealed, the whole third mold for forming was placed into a pressurized container and, pressured to 3 atmospheres pressure, and the sheet for forming was shaped to correspond to the third mold for forming. At this time, a metal pipe was connected to an air-evacuating hole in the third mold for forming, and its terminal end part was opened to the outside. After shaping, an ultraviolet light irradiation was carried out for 2 minutes from a distance of 10 cm by using an ultraviolet lamp of a metal halide type of 80 W/cm, whereby a molding was obtained with hardening of the whole shaped sheet. Although the molding was a little soft immediately after release from the mold, complete hardening was observed after 1 day.

The process of example 4 was repeated, except that the partial viscosity adjustment of a sheet for forming by means of a mask was not carried out, to obtain a molding of example for comparison 4.

When a comparison was carried out between the thickness ratios of the product of example 4 and the product of example for comparison 4, example 4 showed a value of 1.5 and example for comparison 4 as value of 5.7, and thus, it is seen that the molding of example 4 which illustrate the method for molding in the present invention shows smaller variation deviation in thickness.

EXAMPLE 5

The process of example 4 was repeated to get a sheet for forming of thickness 2 mm, which had a 30% content of glass fiber, except that a resin solution obtained by mixing 100 parts of said resin B with 2 parts of tertiary-butyl perbenzoate was used.

Using this sheet for forming, a process similar to that of the example 4 was carried out to shape the sheet for forming. Then, a molding was obtained by hardening the whole shaped sheet by heating at 130° C. Besides, in said process, an ultraviolet light irradiation, to partially adjust the viscosity of the sheet for forming, was carried out for 20 seconds from a distance of 10 cm using a high pressure lamp of a metal halide type of 80 W/cm.

The same process as set forth in example 5 was repeated, except the partial viscosity adjustment by means of a mask was not carried out, to get a molding of the example for comparison 5.

When the thickness ration was compared between the moldings from example 5 and from example for comparison 5, that of the example 5 was 1.6 and that of the example for comparison 5 was 5.5. Thus, it is seen that the moldings obtained from example 5 which used the method for molding of the present invention showed smaller variation in thickness.

EXAMPLE 6

A resin solution was prepared by mixing 100 parts of said resin A, 0.1 part of benzoin methyl ether, and 1.5 parts of tertiary-butyl perbenzoate.

This resin solution, 60 parts, was applied on a vinylon film which was later converted into a covering film, on which 40 parts of a glass fiber (a glass strand length of 50 mm) was spread, and further on which said vinylon film was placed. After degassing, a sheet for forming of a thickness of 2.5 mm and of a glass content of 46% was obtained. Excess resin solution was removed by passing the sheet through a pair of soft gum rollers.

This sheet for forming was treated as in example 1 with partial viscosity adjustment by ultraviolet light irradiation after it was arranged over a part of the opening hole of the first mold for forming. Incidentally, the irradiation time of ultraviolet light was 90 seconds at this time and the light-source lamp was 200 W, at a distance was 10 cm. As a result, the sheet for forming, similar to the case of example 1, was one which had portions which partially differed in viscosity. Thereafter, the first mold for forming was placed in a container capable of being freely heated and pressurized, as carried out in the example 3. The shaping followed by hardening afforded a molding of thickness ratio 1.5.

The same process as in example 6 was repeated, except that the partial viscosity adjustment of the sheet for forming by means of a mask was not carried out, to get a molding of the example for comparison 6 which had a ratio 4.5. As clearly seen from these results, the moldings obtained from the example 6, according to the method of molding of the present invention, shows smaller variation in thickness.

According to the method for molding a resin reinforced with fiber of the present invention mentioned so far, it is possible to partially control stretching of a sheet for forming by the tension which generates during shaping and, thereby, to freely adjust the thickness of a molding of a sheet for forming, having portions with differing viscosities, is used, and the molding with shaping as well as curing is carried out. Accordingly, it is possible to produce a molding which has uniform thickness without variations in thickness of portions of the molding. This solves the problem that the strength and so on of a molding is reduced due to formation of a part where the thickness is reduced. Also, as occasion demands, various kinds of controllable properties are improved with variation in thickness of portions of moldings, for example, the mechanical strength is increased by increasing the thickness at a defined part more than that of other parts, so that it is possible to produce a resin molding reinforced with fiber which is superior in quality and properties, according to the purpose for the use of a molding and according to properties demanded.

What is claimed is:

1. In the method of forming a molded article of thermosetting resin which comprises: forming a sheet comprising said thermosetting resin and reinforcing fibers; effectively contacting such sheet with a molding surface having portions which, during subsequent molding, cause different amounts of undesirable thinning in portions of the walls of said molded article; and heating and pressurizing such contacted sheet and molding surface to a temperature and a pressure sufficient to conform said sheet of thermosetting resin to said molding surface, and then cooling said molding article to set the molded shape thereof;

the improvement, whereby reducing the formation, in said wall portions of said molded article, of undesired differing thicknesses, which comprise:

prior to molding, modifying the viscosity of portions of said sheet of thermosetting resin corresponding to said wall portions which had been undesirably thinned to viscosities which differ from the viscosity of said thermosetting resin in the remainder of said sheet; and molding said sheet under conditions sufficient to form said molding article thereby effecting reduced undesired differences in wall thicknesses corresponding to said molding surface portions.

2. A method as claimed in claim 1 wherein the viscosity of said portions said sheet is modified by irradiation of with differing doses of light.

3. A method as claimed in claim 2 wherein said light is ultra violet light.

4. A method as claimed in claim 1 wherein the viscosity of said resin is increased by irradiation with light.

5. A method as claimed in claim 1 wherein the viscosity of said portions of said sheet is modified by heating each portion of said sheet to a different temperature.

6. A method as claimed in claim 5 wherein the viscosity of said resin portions is increased as a function of the amount of heating.

7. A method as claimed in claim 2 wherein the viscosity of said resin is modified as a function of the amount of the effective presence of a radical initiator.

8. A method as claimed in claim 7 wherein said resin comprises a polyester and said initiator is a photoreaction initiator.

9. A method as claimed in claim 7 wherein said resin is an epoxy (meth) acrylate resin.

10. A method as claimed in claim 1 wherein said resin has a thickener admixed therewith.

11. A method as claimed in claim 10 wherein said thickener comprises at last one member selected from the group consisting of magnesium oxide and toluene diisocyanate.

12. A method as claimed in claim 1 including hardening said molded resin by exposure to light irradiation in addition to differential light irradiation viscosity modification.

13. A method as claimed in claim 12 wherein said hardening light irradiation is ultra violet light.

14. A method as claimed in claim 1 including hardening said molded resin by exposure to heat in addition to differential heat viscosity modification.

15. A method as claimed in claim 1 including allowing said molded article to cure at ambient conditions.

16. A method as claimed in claim 1 wherein said fiber content of said molded article is about 5 to 60 weight percent.

17. A method as claimed in claim 1 wherein said fiber content of said molded article is about 20 to 50 weight percent.

18. A method as claimed in claim 1 wherein said fibers are glass fibers.

19. A method as claimed in claim 2 including laminating a light permeable covering film on a side of said sheet for forming which is to be light irradiated.

20. A method as claimed in claim 19 wherein said light permeable covering film is patterned in a defined mode by way of at least one of a semi-transparent and an opaque ink disposed thereon.

21. A method as claimed in claim 20 wherein said patterning comprises shading.

22. A method as claimed in claim 2 including providing a mask, having areas of partially differing transparency, between said light and said sheet for forming.

* * * * *